US006550515B2

(12) United States Patent
Lavelle

(10) Patent No.: US 6,550,515 B2
(45) Date of Patent: Apr. 22, 2003

(54) ROLLED MATERIAL DISPENSING APPARATUS

(76) Inventor: Edward Lavelle, Apartment 22H-8660-182, Edmonton, Alberta (CA), T5T 1M3

( * ) Notice: Subject to any disclaimer, the term of this patent is extended or adjusted under 35 U.S.C. 154(b) by 89 days.

(21) Appl. No.: 09/727,488

(22) Filed: Dec. 4, 2000

(65) Prior Publication Data

US 2002/0066538 A1 Jun. 6, 2002

(51) Int. Cl.[7] .............................................. B32B 31/00
(52) U.S. Cl. ....................... 156/527; 156/577; 156/579; 225/9
(58) Field of Search ................................ 156/574, 577, 156/579, 527; 225/9, 38

(56) References Cited

U.S. PATENT DOCUMENTS

| | | | | |
|---|---|---|---|---|
| 908,313 A | * | 12/1908 | Nelson | 225/38 |
| 1,518,750 A | * | 12/1924 | Nelson | 225/38 |
| 2,642,939 A | * | 6/1953 | Oldenburg et al. | 101/288 |
| 2,673,042 A | * | 3/1954 | Fritzinger | 15/104.002 |
| 2,798,551 A | * | 7/1957 | Polster | 225/19 |
| 3,570,731 A | * | 3/1971 | Waltz | 225/38 |
| 4,052,248 A | | 10/1977 | Hunter | |
| 4,426,245 A | | 1/1984 | Driscoll et al. | |
| 4,470,870 A | | 9/1984 | Driscoll et al. | |
| 4,525,235 A | * | 6/1985 | Todisco | 156/511 |
| 4,572,761 A | | 2/1986 | Phillips, Sr. | |
| 4,755,254 A | | 7/1988 | Bedwell | |
| 4,756,460 A | * | 7/1988 | Ornros | 225/54 |
| 6,206,990 B1 | * | 3/2001 | Glenn | 156/574 |

* cited by examiner

*Primary Examiner*—Mark A. Osele
(74) *Attorney, Agent, or Firm*—Ryan W. Dupuis; Adrian D. Battison; Michael D. Williams

(57) ABSTRACT

A dispensing apparatus is provided for dispensing a masking apron of the type including a sheet of apron material having a strip of adhesive tape overlapping along one side thereof. The apparatus generally includes a frame structure which supports a shaft having plural longitudinal sections mounted end to end along a vertical axis. Each longitudinal section is arranged to mount a corresponding roll of apron material thereon while remaining selectively separable from adjacent longitudinal sections to simplify the task of replacing a lowermost roll on the shaft. An elongate cutting blade is provided which extends at an angle offset from the shaft for providing a gradual cutting edge to cut the dispensed masking apron from the dispensing apparatus. A retainer member which is biased inwardly towards the shaft is provided for securing the roll of apron material between the shaft and the corresponding retainer member. The retainer member is inclined inwardly towards the shaft as it extends in a longitudinal direction of the shaft so as to automatically engage the roll of material between the retainer member and the shaft as the roll of material is loaded onto the shaft.

20 Claims, 3 Drawing Sheets

ROLLED MATERIAL DISPENSING APPARATUS

FIELD OF THE INVENTION

This invention relates to a dispensing apparatus for rolled material and more particularly to a dispensing apparatus for dispensing a masking apron therefrom.

BACKGROUND

Masking aprons are used frequently in the auto body industry and the like to shield parts of the vehicle to remain untouched. The masking apron generally includes a sheet of masking material having a strip of adhesive tape overlapped along one edge thereof for affixing the apron material to a work surface.

Dispensers for masking aprons generally include one or more shafts for supporting rolled sheeted material thereon as well as one or more corresponding tape dispensers for dispensing tape therefrom in an overlapping configuration with the sheeted material.

In U.S. Pat. No. 4,572,761 to Phillips, U.S. Pat. No. 4,052,248 to Hunter and U.S. Pat. No. 4,426,245 to Driscoll each provide dispensers which are arranged for supporting various sized rolls of apron material thereon. Each of these dispensers however requires awkward manipulation of some form to either load or unload rolls of material thereon while requiring the further step of manually engaging a retainer member thereon to prevent the roll from unrolling itself.

The present invention is concerned with certain improvements to masking apron dispensers.

SUMMARY

According to the present invention there is provided a dispensing apparatus for dispensing a masking apron including apron material and adhesive tape along one side of the apron material, the apparatus comprising:

- a frame structure;
- a shaft supported on the frame structure arranged to support a roll of apron material on the shaft for rotation about the shaft;
- a tape support mounted on the frame structure spaced radially outward from the shaft, the tape support being arranged to rotatably support a roll of adhesive tape thereon in alignment with the roll of apron material on shaft; and
- an elongate blade mounted on the frame structure spaced radially from the shaft, the blade extending at an incline in relation to a longitudinal direction of the shaft for cutting the apron material and adhesive tape which are dispensed from the frame structure.

The use of an inclined blade which extends along side the shaft provides a quick and simple method of cutting the apron material dispensed from the dispensing apparatus by engaging the apron material gradually to reduce the resistance to cutting. When a sheet is unrolled from the roll of apron material, a top end of the sheet is pulled laterally towards the blade such that pressure is concentrated at the upper end of the blade first and is gradually displaced downwards along the blade as the apron material is cut. The cutting edge of the inclined blade is thus oriented substantially perpendicularly to the direction in which the apron material is pulled towards the blade even when the apron material is cut gradually from one end to the other. The inclined blade also provides more access to the rolls of paper when handling rolls on the shaft.

The blade preferably extends at an angle to a plane containing the shaft therein and includes a cutting edge which extends tangentially in relation to the shaft.

When the shaft is arranged to support numerous rolls of apron material at spaced locations along the shaft, the blade preferably extends substantially along the full length of the shaft.

The blade may be selectively separable from the frame structure for replacement or for sharpening.

According to a further aspect of the present invention there is provided a dispensing apparatus for dispensing a masking apron, the apparatus comprising:

- a frame structure;
- a shaft supported on the frame structure arranged to support a roll of apron material on the shaft for rotation about the shaft;
- a tape support mounted on the frame structure spaced radially outward from the shaft, the tape support being arranged to rotatably support a roll of adhesive tape on the tape support; and
- a retainer member mounted on the frame structure having a loading portion spaced radially outward from the shaft and a flexible portion spaced radially inwards towards the shaft in relation to the loading portion;
- the flexible portion of the retainer member being flexible between a relaxed position adjacent the shaft and a flexed position spaced radially outward from and biased towards the shaft for engaging the roll of apron material between the retainer member and the shaft in the flexed position;
- the retainer member extending in a longitudinal direction of the shaft from the loading portion to the flexible portion of retainer member such that the flexible portion of the retainer member is displaced into the flexed position by a roll of apron material as the roll is loaded onto the shaft.

The particular arrangement of the retainer member to extend in a longitudinal direction of the shaft as it arcs inwardly toward the shaft provides a suitable camming surface arranged to engage a roll of apron material as it is inserted onto the shaft. The retainer member is thus automatically deflected into the flexed position without the need to manually disengage and re-engage the retainer member whenever the roll of apron material requires changing. This is particularly useful when mounting large rolls into the dispensing apparatus as both hands of the individual using the apparatus are typically required for manipulating the roll of apron material and thus further manual displacement of the retainer member would require awkward manipulation.

The retainer member preferably includes a smooth camming face for engaging the roll of apron material to displace the retainer member into the flexed position as the roll of apron material is mounted on the shaft.

The retainer member may be secured at respective ends thereof at substantially diametrically opposed locations on the frame structure.

The retainer member preferably comprises an elongate flexible rod which is substantially constant in length in both the flexed and relaxed positions.

The retainer member may further include an unloading portion extending from the flexible portion opposite the loading portion, the unloading portion arcing away from the shaft as it extends in the longitudinal direction of the shaft.

According to a further aspect there is provided a dispensing apparatus for dispensing a masking apron, the apparatus comprising:

a frame structure;

an upright shaft supported on the frame structure comprising a plurality of longitudinal sections coupled end to end, each longitudinal section being selectively separable from an adjacent longitudinal section;

a plurality of support members mounted on the respective longitudinal sections of the shaft, the support members extending radially outward from the shaft so as to be arranged to support respective rolls of apron material on the respective longitudinal sections of the shaft for rotation about the shaft; and a plurality of tape supports mounted on the frame structure spaced radially outward from the shaft and spaced in a longitudinal direction of the shaft from the respective support members so as to be arranged to rotatably support respective rolls of adhesive tape thereon in alignment with the respective rolls of apron material.

The use of plural longitudinal sections of the shaft permit the shaft to be easily disassembled and reassembled when changing one of numerous rolls of apron material supported on the shaft. In particular when it is required to replace the lowermost roll of apron material the arrangement of the shaft using multiple longitudinal sections does not require the uppermost roll of apron material to be removed from the shaft.

The support members are preferably selectively separable from the frame structure with the respective longitudinal sections such that the rolls of apron material may remain supported thereon.

The support members may be adjustably mounted on the respective longitudinal sections for mounting the support members at numerous relative heights thereon.

The support members preferably each comprise a collar selectively mounted on the respective longitudinal section of the shaft and a bearing plate rotatably supported on the collar for supporting a roll of apron material thereon.

Each longitudinal section of the shaft preferably comprises a tubular member. In this instance a support rod may be slidably received through the tubular members for supporting the longitudinal sections in alignment thereon.

The support rod preferably extends only partway through an uppermost tubular member from a bottom end towards a top end thereof so as to simply removal of the uppermost longitudinal section of the shaft when replacing a lower roll of apron material.

There may be provided a locking pin extending through the support rod and the tubular member of an uppermost longitudinal section for restricting relative sliding movement therebetween.

Each tape support preferably includes an adjustable mounting mechanism arranged to support the tape support at various relative heights.

There may be provided an elongate blade spaced radially from the shaft, extending alongside the shaft substantially the combined length of all the longitudinal sections of the shaft.

BRIEF DESCRIPTION OF THE DRAWINGS

In the accompanying drawings, which illustrate an exemplary embodiment of the present invention.

DETAILED DESCRIPTION

Figure 1:
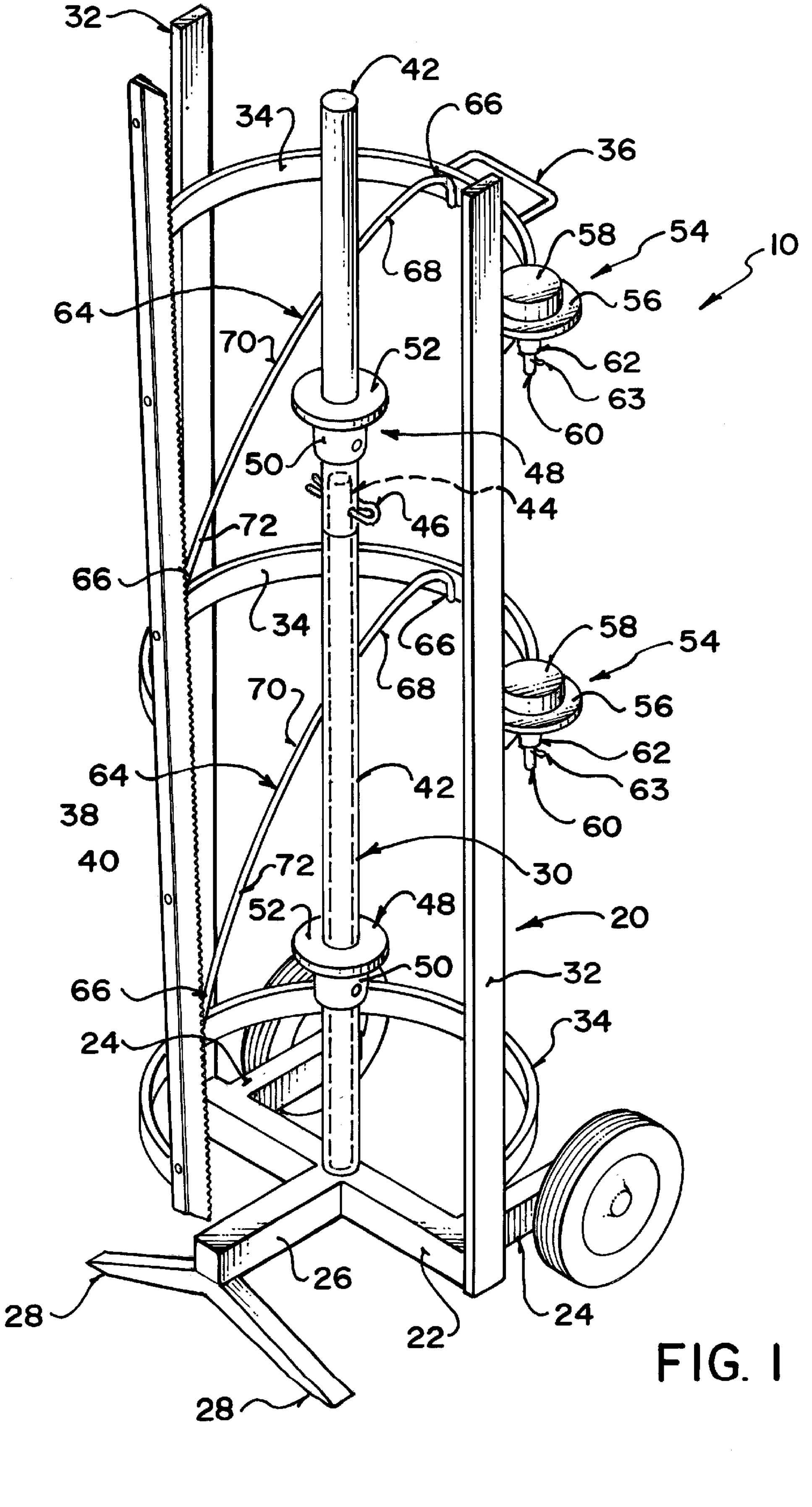
FIG. 1 is an isometric view of the dispensing apparatus before the rolls of apron material are supported thereon.

Referring to the accompanying drawings, there is illustrated a dispensing apparatus generally indicated by reference numeral 10. The apparatus 10 is arranged for dispensing a masking apron including a sheet of apron material 12 dispensed from a roll 14 of apron material and adhesive tape 16 along one side of the apron dispensed from a roll 18 of adhesive tape. The masking apron is generally of the type frequently used in auto body repair to shield areas which require protection from working materials such as paint and the like.

The apparatus 10 generally includes a frame structure 20 which is supported for rolling movement along the ground. The frame structure 20 extends upwardly from a laterally extending base member 22 which mounts respective wheel supports 24 on respective ends thereof. Each wheel support 24 extends rearwardly from the base member 22 to support a respective wheel thereon. A front support 26 extends forwardly from the base member 22 spaced between respective ends thereof and mounts a pair of feet 28 on a free end thereof for supporting the base member 22 in a level position on the ground.

A shaft 30 is mounted centrally on the base member 22 to extend upwardly along a vertical axis therefrom. A pair of uprights 32 are mounted on diametrically opposed sides of the shaft 30 spaced outwardly and parallel thereto. The uprights 32 are connected on opposing ends of the base member 22 to extend upwardly therefrom. A set of arcuate cross members 34 are coupled between the uprights 32 to define the frame structure 20 which surrounds the shaft 30.

Each cross member 34 extends in an arc approximately 270° about the shaft 30 so as to define a generally circular frame structure. The cross members 34 are spaced apart in a longitudinal direction of the shaft so as to define a lowermost, an intermediate and an uppermost cross member.

A handle 36 is mounted on the uppermost cross member 34 to extend rearwardly therefrom to displace the frame structure 20 for rolling movement along the ground when the feet 28 are raised from the ground by tilting the frame structure with the handle.

An elongate blade 38 is connected across respective free ends of the cross members 34 so as to extend longitudinally along side the shaft 30 spaced radially outwardly therefrom. The blade 38 includes a cutting edge 40 which extends from the blade along a plane which lies tangentially in relation to the shaft 30. The blade 38 is further oriented at an incline and angularly offset relative to the shaft 30 as well as a vertical plane containing the shaft 30 therein.

Fasteners are used for supporting the blade 38 on the frame structure 20 such that the blade remains selectively separable from the frame structure for replacement or sharpening as desired.

The shaft 30 comprises two longitudinal sections 42 which are coupled end to end along the vertical axis of the shaft. Each longitudinal section 42 is a tubular member which is arranged to receive a common support rod 44 slidably extending therethrough. An intersection between the longitudinal sections 42 is located in proximity to the intermediate cross member 34. The support rod 44 is arranged to extend only partway through the uppermost longitudinal section 42 from a bottom end to a top end thereof to assist in removing the uppermost longitudinal section when replacing a lowermost roll of apron material supported on the shaft.

A locking pin 46 is arranged to be received through the uppermost longitudinal section 42 and the support rod 44 received therein so as to restrict relative sliding movement therebetween and secure the longitudinal sections 42 to the frame structure 20. The locking pin 46 is located in the uppermost tubular member adjacent the intersection between the pair of longitudinal sections 42.

The blade 38 is arranged to extend longitudinally with the shaft substantially the combined length of all the longitudinal sections 42 thereof.

A support member 48 is mounted on each longitudinal section 42 adjacent a bottom end thereof. Each support member 48 generally comprises a collar 50 which is slidably mounted on the corresponding longitudinal section of the shaft and adjustably mounted in place by a set screw for securement at various relative heights. The collar supports a bearing plate 52 rotatably thereon for rotatably supporting a corresponding roll of apron material 14 thereon for rotation about the vertical axis of the shaft 30.

The cross members 34 are longitudinally positioned in relation to the shaft adjacent the top end of each longitudinal section 42 for supporting a tape support 54 thereon in longitudinal proximity to the top end of one of the rolls 14 of apron material. The tape support 54 generally comprises a horizontal circular plate 56 having a raised circular guide 58 secured on a top face thereof. The roll 18 of adhesive tape is rotatably supported on the plate 56 about the guide 58 for dispensing the adhesive tape therefrom.

The plate 56 mounts on a shaft 60 which is adjustably supported within a casing 62 mounted on the corresponding cross member 34. The shaft 60 is adjustably supported within the corresponding casing 62 for supporting the corresponding roll 14 of adhesive tape at various relative heights. A locking pin 63 is provided securing the shaft 60 within its casing 62 at a selected relative height. The adhesive tape is thus permitted to be mounted in alignment with any one of numerous standard heights of rolls 14 of apron material 12.

A retainer member 64 is mounted on the frame structure 20 for co-operation with each of the longitudinal sections 42 of the shaft. Each retainer member 64 generally comprises an elongate metallic rod which is generally flexible but fixed in length. The retainer member 64 is mounted at respective ends at longitudinally spaced positions on the frame structure 20 corresponding to respective top and bottom ends of a corresponding longitudinal section of the shaft. The ends 66 of the retainer member 64 are mounted on the frame structure spaced radially outwardly from the shaft 30 at substantially diametrically opposed positions in relation to the shaft.

Each retainer member 64 arcs in a longitudinal direction of the shaft from an upper loading portion 68 through an intermediate flexible portion 70 to a lower unloading portion 72. The retainer member 64 is spaced radially outwardly from the shaft at both the loading portions 68 and unloading portions 72 at respective ends of the retainer member while arcing inwardly towards the shaft 30 at the flexible portion 70 in relation to the corresponding loading and unloading portions thereof.

Figure 2:
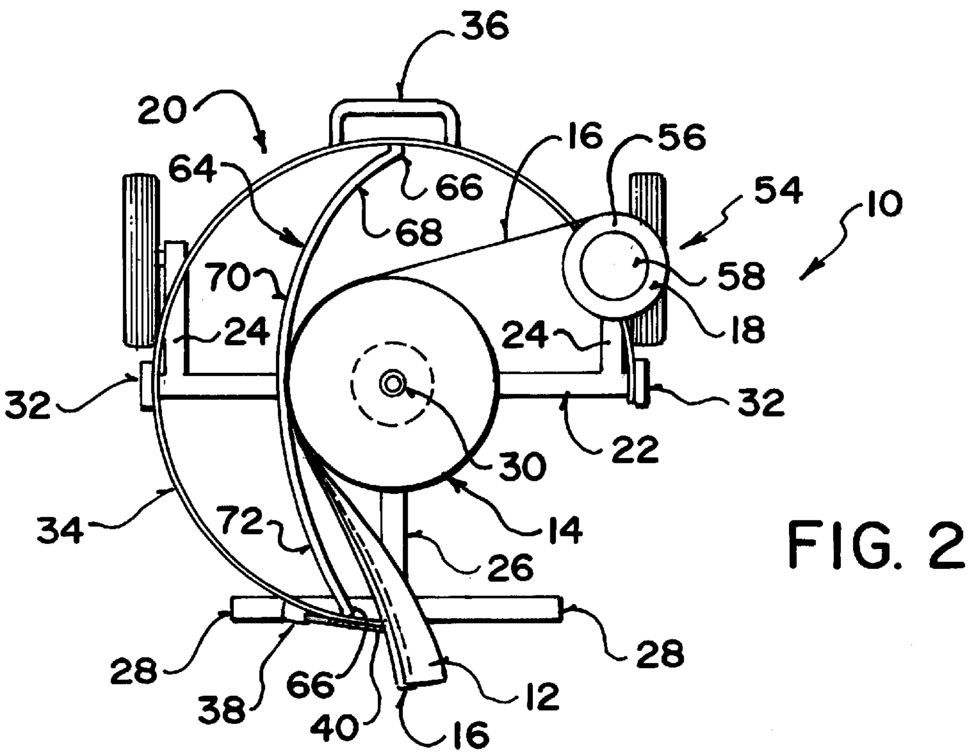
FIG. 2 is a top plan view of the dispensing apparatus shown with a roll of apron material and a roll of adhesive tape supported thereon with the retainer member in the flexed position.
Figure 3:
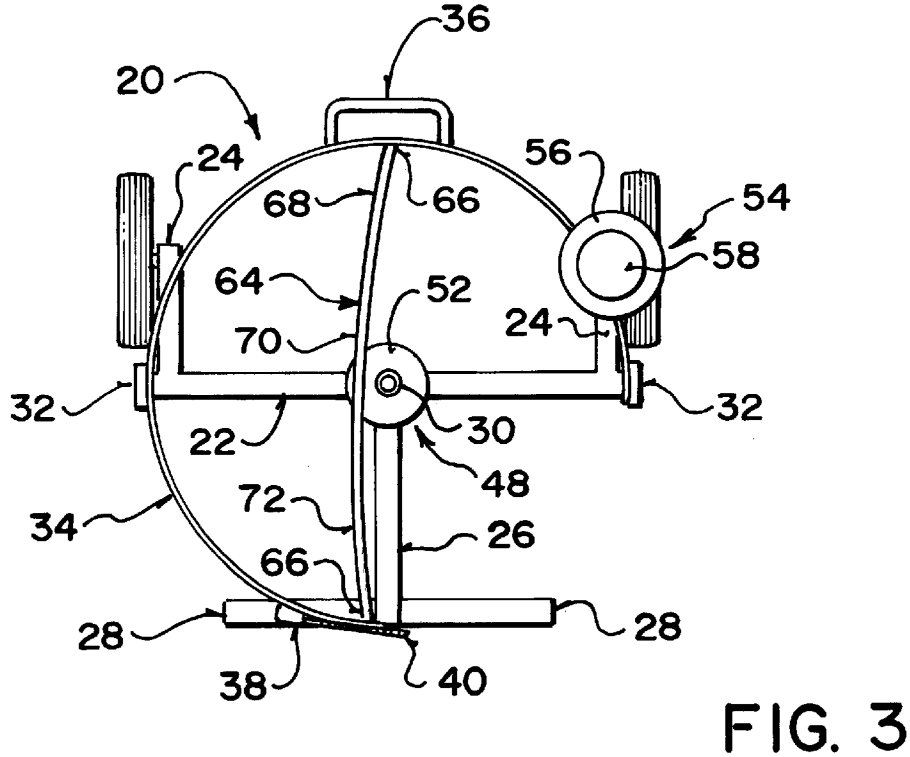
FIG. 3 is a top plan view of the dispensing apparatus shown with the rolls of apron material removed therefrom with the retainer members in the relaxed position.
Figure 4:
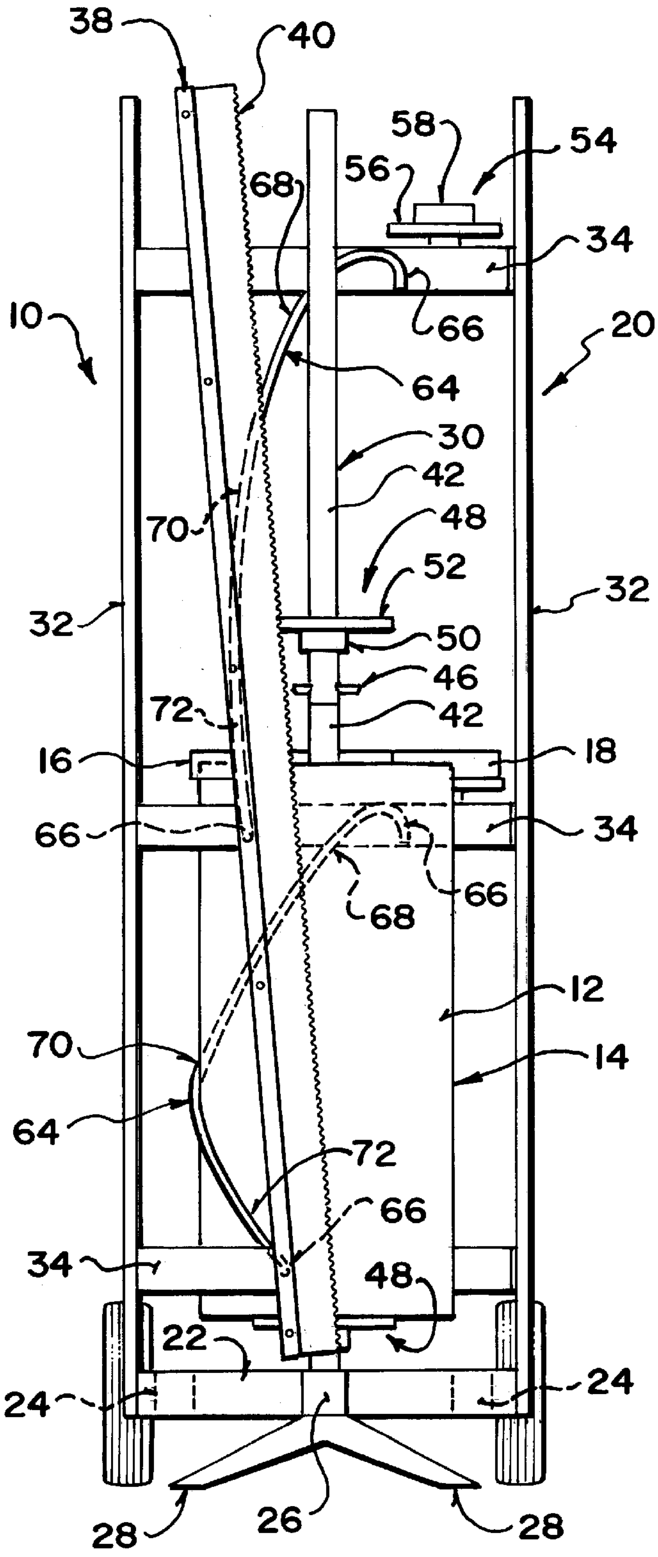
FIG. 4 is a front elevational view in which a roll of apron material is supported on the lowermost longitudinal section of the shaft with the corresponding retainer member being in the flexed position while the uppermost retainer member is in the relaxed position.
Figure 5:
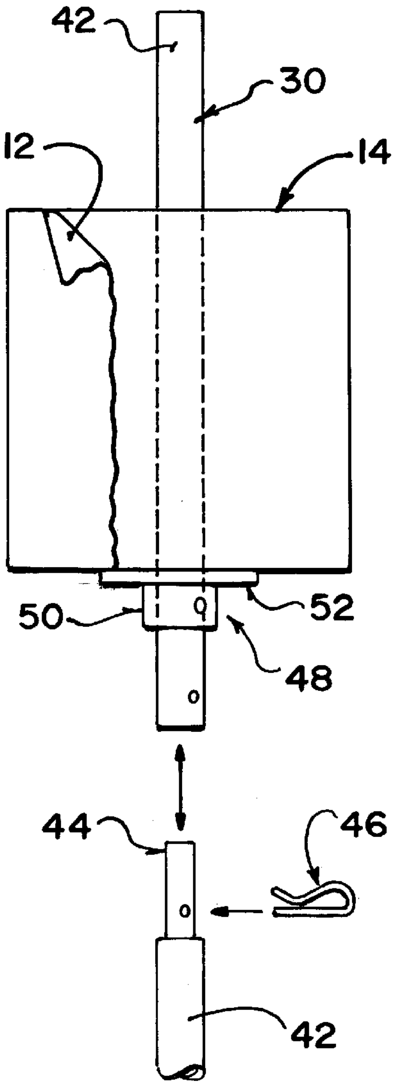
FIG. 5 is an enlarged view of the uppermost longitudinal section of the shaft shown separated from the lowermost section of the shaft while supporting a roll of apron material thereon.

The flexible portion 70 is arranged to be movable between a relaxed position as shown in FIG. 3 adjacent the shaft 30 and a flexed position as illustrated in FIG. 2 wherein the flexible portion 70 is spaced outwardly from the shaft but biased inwardly towards the shaft to secure a roll 14 of apron material 12 between the shaft 30 and the retainer member 64.

The retainer member 64 defines a generally smooth camming surface about both the unloading and loading portions thereof for automatically deflecting the flexible portion 70 away from the shaft when a roll 14 of apron material 12 is either loaded or unloaded from the corresponding longitudinal section of the shaft.

In use a roll 14 of apron material 12 is supported on each support member 48 with a corresponding roll 18 of adhesive tape being supported on the corresponding tape support 54. Depending upon the height of the roll 14 of apron material 12, the height of the collar 50 of the corresponding support member 48 is first adjusted using the set screw thereon such that the top end of the roll is in proximity to the corresponding tape support 54. The height of the tape support 54 may then be further adjusted to select the degree to which the adhesive tape 16 is required to overlap the edge of the apron material 12. Similar height adjustments are performed for each roll 14 of apron material to be supported on the shaft 30.

When dispensing the masking apron from the dispensing apparatus a sheet of the apron material 12 with the adhesive tape along one edge thereof is drawn out from the shaft 30 to a desired length and subsequently cut along the blade 38. The inclination of the blade 38 permits gradual cutting of the masking apron to reduce the resistance to the cutting action of the blade. A top comer of the masking apron is pulled in a lateral direction against the blade 38 such that the pressure of the blade against the masking apron is first applied to a top edge of the masking apron and is subsequently displaced downwards across the masking apron as the masking apron is cut along the blade. The cutting edge of the inclined blade is thus oriented substantially perpendicularly to the direction in which the apron material is pulled towards the blade even when the apron material is cut gradually from one end to the other. The inclined blade also provides more access to the rolls of paper when handling rolls on the shaft.

In order to replace an uppermost roll 14 of apron material the roll is simply slid upwardly along the shaft 30 and removed from a top end thereof. The unloading portion 72 of the retainer member which curves away from the shaft ensures that the roll 14 does not snag on the flexible portion 70 of the retainer member 64 engaged thereon for ease of removal. When positioning the new roll, the roll is first aligned over the shaft 30 and then simply dropped thereon. The loading portion 68 of the corresponding retainer member 64 is automatically cammed along the bottom edge of the roll of apron material so as to automatically deflect the flexible portion 70 into the flexed position without manual manipulation required thereof.

When replacing the bottom roll of apron material the locking pin 46 is first removed from the shaft such that the uppermost longitudinal section may be removed. When removing the uppermost longitudinal section, the roll of apron material supported thereon may remain engaged thereon as the arrangement of the corresponding retainer member 64 is automatically deflected out of the way when the uppermost longitudinal section is slidably displaced from the support rod 44 extending therethrough. When removing an existing roll of apron material from the lowermost longitudinal section 42 the existing roll will engage the unloading portion of the uppermost retainer member 64 to automatically deflect the uppermost retainer member 64 into the flexed position so as to permit the existing roll to be slidably displaced past the uppermost retainer member 64.

In the instance where the uppermost longitudinal section 42 does not have a roll supported thereon and the retainer member 64 is in the relaxed position, the uppermost longitudinal section 42 is easily removed from the shaft 30 as the flexible portion of the uppermost retainer member 64 is spaced above the end of the support rod 44 which extends only partway through the uppermost longitudinal section of the shaft. The uppermost longitudinal section can thus be raised until it is free from the support rod 44 but before the support member mounted thereon engages the retainer member for subsequent removal of the uppermost longitudinal section by lateral displacement away from the shaft.

In either instance a new roll of apron material which is to be inserted on the lowermost longitudinal section 42 automatically deflects both retainer members 64 into the flexed position as it is displaced longitudinally there past similarly as described above. To complete installation of a new roll on the lowermost longitudinal section 42 the uppermost longitudinal section is replaced onto the support rod 44 with the locking pin 46 inserted therethrough for securement of the longitudinal sections 42 to the shaft 30.

In further embodiments, the shaft may be arranged to support a single roll thereon while still achieving the improved results of the inclined blade arrangement and the self-loading retainer member. Alternatively, the shaft may include three or more longitudinal sections mounted on the support rod for supporting multiple rolls of apron material thereon.

Also, in place of the frame structure illustrated herein for supporting the shaft for rolling movement across the ground, the frame structure may comprise a set of legs for supporting the shaft in a fixed location on the ground or on a workbench. A wall mounting bracket would also be suitable for supporting the shaft described herein including the blade and retainer member associated therewith, on a wall or other suitable supporting surface.

While various embodiments of the present invention have been described in the foregoing, it is to be understood that other embodiments are possible within the scope of the invention. The invention is to be considered limited solely by the scope of the appended claims.

What is claimed is:

1. A dispensing apparatus for dispensing a masking apron, the apparatus comprising:

a frame structure;

a shaft supported on the frame structure arranged to support a roll of apron material on the shaft for rotation about the shaft;

a tape support mounted on the frame structure spaced radially outward from the shaft, the tape support being arranged to rotatably support a roll of adhesive tape on the tape support; and a retainer member mounted on the frame structure having a loading portion spaced radially outward from the shaft and a flexible portion spaced radially inwards towards the shaft in relation to the loading portion;

the flexible portion of the retainer member being flexible between a relaxed position adjacent the shaft and a flexed position spaced radially outward from and biased towards the shaft for engaging the roll of apron material between the retainer member and the shaft in the flexed position;

the retainer member extending in a longitudinal direction of the shaft from the loading portion to the flexible portion of retainer member such that the flexible portion of the retainer member is displaced into the flexed position by a roll of apron material as the roll is loaded onto the shaft.

2. The apparatus according to claim 1 wherein the retainer member includes a smooth camming face for engaging the roll of apron material to displace the retainer member into the flexed position as the roll of apron material is mounted on the shaft.

3. The apparatus according to claim 1 wherein the retainer member is secured at respective ends thereof at substantially diametrically opposed locations on the frame structure.

4. The apparatus according to claim 3 wherein the retainer member comprises an elongate flexible rod.

5. The apparatus according to claim 3 wherein the retainer member is substantially constant in length in both the flexed and relaxed positions.

6. The apparatus according to claim 1 wherein the retainer member includes an unloading portion extending from the flexible portion opposite the loading portion, the unloading portion arcing away from the shaft as it extends in the longitudinal direction of the shaft.

7. A dispensing apparatus for dispensing a masking apron, the apparatus comprising:

a frame structure;

an upright shaft supported on the frame structure comprising a plurality of longitudinal sections supported in an end to end configuration, each longitudinal section comprising a tubular member being selectively separable from an adjacent longitudinal section;

a support rod slidably received through the tubular members for supporting the longitudinal sections in alignment thereon;

a plurality of support members mounted on the respective longitudinal sections of the shaft, the support members extending radially outward from the shaft so as to be arranged to support respective rolls of apron material on the respective longitudinal sections of the shaft for rotation about the shaft; and a plurality of tape supports mounted on the frame structure spaced radially outward from the shaft and spaced in a longitudinal direction of the shaft from the respective support members so as to be arranged to rotatably support respective rolls of adhesive tape thereon in alignment with the respective rolls of apron material.

8. The apparatus according to claim 7 wherein the support members are selectively separable from the frame structure together with the respective longitudinal sections.

9. The apparatus according to claim 7 wherein the support members are adjustably mounted on the respective longitudinal sections for mounting the support members at numerous heights thereon relative to the frame structure.

10. The apparatus according to claim 7 wherein the support members each comprise a collar mounted on the respective longitudinal section of the shaft and a bearing plate rotatably supported on the collar for supporting a roll of apron material thereon.

11. The apparatus according to claim 7 wherein the support rod extends only partway through an uppermost tubular member from a bottom end towards a top end thereof.

12. The apparatus according to claim 7 wherein there is provided a locking pin extending through the support rod and the tubular member of an uppermost longitudinal section for restricting relative sliding movement therebetween.

13. The apparatus according to claim 7 wherein each tape support includes an adjustable mounting mechanism for supporting the tape support at various relative heights.

14. The apparatus according to claim 7 wherein there is provided an elongate blade supported on the frame structure spaced radially from the shaft and extending alongside the shaft substantially the combined length of all the longitudinal sections of the shaft.

15. A dispensing apparatus for dispensing a masking apron, the apparatus comprising:

a frame structure;

an upright shaft supported on the frame structure comprising a plurality of longitudinal sections supported in an end to end configuration, each longitudinal section being selectively separable from an adjacent longitudinal section;

a plurality of support members mounted on the respective longitudinal sections of the shaft, the support members extending radially outward from the shaft so as to be arranged to support respective rolls of apron material on the respective longitudinal sections of the shaft for rotation about the shaft;

a plurality of tape supports mounted on the frame structure spaced radially outward from the shaft and spaced in a longitudinal direction of the shaft from the respective support members so as to be arranged to rotatably support respective rolls of adhesive tape thereon in alignment with the respective rolls of apron material; and an elongate blade spaced radially from the shaft and extending alongside the shaft substantially the combined length of all the longitudinal sections of the shaft.

16. The apparatus according to claim 15 wherein the blade extends at an angle to a plane containing the shaft therein.

17. The apparatus according to claim 15 wherein the blade includes a cutting edge which extends tangentially in relation to the shaft.

18. The apparatus according to claim 15 wherein the blade is selectively separable from the frame structure.

19. The apparatus according to claim 15 wherein each longitudinal section of the shaft comprises a tubular member and wherein there is provide a support rod slidably received through the tubular members for supporting the longitudinal sections in alignment thereon.

20. The apparatus according to claim 15 wherein the blade extends at an incline in relation to a longitudinal direction of the shaft for cutting the apron material and adhesive tape which are dispensed from the frame structure.

* * * * *